(12) United States Patent
Norbeck et al.

(10) Patent No.: US 8,349,288 B2
(45) Date of Patent: Jan. 8, 2013

(54) PROCESS FOR ENHANCING THE OPERABILITY OF HOT GAS CLEANUP FOR THE PRODUCTION OF SYNTHESIS GAS FROM STEAM-HYDROGASIFICATION PRODUCER GAS

(75) Inventors: Joseph Norbeck, Riverside, CA (US); Chan Seung Park, Yorba Linda, CA (US); Kiseok Kim, Shadow Hills, CA (US)

(73) Assignee: The Regents of the University of California, Oakland, CA (US)

(*) Notice: Subject to any disclaimer, the term of this patent is extended or adjusted under 35 U.S.C. 154(b) by 1001 days.

(21) Appl. No.: 11/635,333

(22) Filed: Dec. 6, 2006

(65) Prior Publication Data

US 2008/0139675 A1 Jun. 12, 2008

(51) Int. Cl.
 *C01B 3/24* (2006.01)
(52) U.S. Cl. ........................ 423/650; 423/644; 252/373
(58) Field of Classification Search ............... 423/644, 423/650; 252/373
See application file for complete search history.

(56) References Cited

U.S. PATENT DOCUMENTS

| | | | |
|---|---|---|---|
| 2,987,387 A | 6/1974 | Carkeek et al. | |
| 3,847,567 A | 11/1974 | Kalina et al. | |
| 3,917,468 A | 11/1975 | Van den Berg et al. | |
| 3,926,775 A | 12/1975 | Schroeder | |
| 3,957,460 A | 5/1976 | Lee | |
| 3,985,519 A | 10/1976 | Kalina et al. | |
| 4,073,698 A | 2/1978 | Blurton et al. | |
| 4,118,204 A | 10/1978 | Eakman et al. | |
| 4,158,697 A | 6/1979 | Cramer | |
| 4,211,540 A | 7/1980 | Netzer | |
| 4,244,706 A | 1/1981 | Forney et al. | |
| 4,341,530 A | 7/1982 | Loth et al. | |
| 4,348,487 A | 9/1982 | Goldstein et al. | |
| 4,372,755 A | 2/1983 | Tolman et al. | |
| 4,385,905 A | 5/1983 | Tucker | |
| 4,394,239 A | 7/1983 | Kitzelmann et al. | |
| 4,397,888 A | 8/1983 | Yannopoulos et al. | |
| 4,483,691 A | 11/1984 | McShea et al. | |
| 4,511,674 A * | 4/1985 | Pedersen et al. | 518/714 |
| 4,526,903 A | 7/1985 | Cummings | |
| 4,560,547 A | 12/1985 | Schora et al. | |
| 4,597,776 A | 7/1986 | Ullman et al. | |
| 4,822,935 A | 4/1989 | Scott | |

(Continued)

FOREIGN PATENT DOCUMENTS

EP 0 952 132 A1 10/1999

(Continued)

OTHER PUBLICATIONS

A.S.K. Raju, C.S. Park and J.M. Norbeck, Synthesis Gas Production using Steam Hydrogasification and Steam Reforming, Accepted, Fuel Proc. Tech., 2008.

(Continued)

*Primary Examiner* — Paul Wartalowicz
(74) *Attorney, Agent, or Firm* — Fish & Associates, PC

(57) ABSTRACT

A process for enhancing the operability of hot gas cleanup for the production of synthesis gas in which a stream of methane rich gas is autothermally reformed at a temperature and pressure sufficient to generate a stream of synthesis gas rich in hydrogen and carbon monoxide, the synthesis gas is subjected to condensation and removing the resultant water, and sulfur impurities are removed from the resultant synthesis gas stream.

13 Claims, 1 Drawing Sheet

U.S. PATENT DOCUMENTS

| | | | |
|---|---|---|---|
| 4,833,171 A | | 5/1989 | Sweeney |
| 4,954,331 A | * | 9/1990 | Lee et al. ............... 423/574.1 |
| 4,983,296 A | | 1/1991 | McMahon et al. |
| 5,250,175 A | | 10/1993 | Des Ormeaux |
| 5,344,848 A | | 9/1994 | Steinberg et al. |
| 5,427,762 A | | 6/1995 | Steinberg et al. |
| 5,439,580 A | | 8/1995 | Akbar et al. |
| 5,447,559 A | | 9/1995 | Rao et al. |
| 5,496,859 A | | 3/1996 | Fong et al. |
| RE35,377 E | | 11/1996 | Steinberg et al. |
| 5,656,044 A | | 8/1997 | Bishop et al. |
| 6,053,954 A | | 4/2000 | Anderson et al. |
| 6,225,358 B1 | | 5/2001 | Kennedy |
| 6,331,573 B1 | * | 12/2001 | Kibby .................... 518/706 |
| 6,350,288 B1 | | 2/2002 | Hirayama et al. |
| 6,444,179 B1 | * | 9/2002 | Sederquist .............. 422/191 |
| 6,495,610 B1 | | 12/2002 | Brown |
| 6,525,104 B2 | * | 2/2003 | Abbott .................... 518/704 |
| 6,527,980 B1 | | 3/2003 | Roden et al. |
| 6,612,269 B2 | | 9/2003 | Heffel et al. |
| 6,774,148 B2 | * | 8/2004 | O'Rear .................... 518/702 |
| 7,087,651 B2 | * | 8/2006 | Lee-Tuffnell et al. ....... 518/700 |
| 7,108,842 B2 | * | 9/2006 | Ramani et al. .......... 423/573.1 |
| 7,208,530 B2 | | 4/2007 | Norbeck et al. |
| RE40,419 E | | 7/2008 | Norbeck et al. |
| 2002/0095867 A1 | | 7/2002 | Katayama |
| 2003/0022035 A1 | | 1/2003 | Galloway |
| 2003/0178342 A1 | * | 9/2003 | Alexion et al. .......... 208/208 R |
| 2003/0203983 A1 | * | 10/2003 | O'Rear et al. ............ 518/728 |
| 2004/0247509 A1 | * | 12/2004 | Newby ................... 423/240 S |
| 2005/0032920 A1 | * | 2/2005 | Norbeck et al. .......... 518/704 |
| 2005/0165261 A1 | | 7/2005 | Abazajian et al. |
| 2005/0256212 A1 | | 11/2005 | Norbeck et al. |
| 2006/0137245 A1 | * | 6/2006 | Kenefake et al. ............ 48/61 |
| 2008/0021123 A1 | | 1/2008 | Norbeck et al. |

FOREIGN PATENT DOCUMENTS

| | | |
|---|---|---|
| WO | WO03/066517 A1 | 8/2003 |
| WO | PCT/US07/21594 | 10/2007 |

OTHER PUBLICATIONS

V.P. Natarajan and G.J. Supes, Rheological studies on a slurry biofuel to aid in evaluating its suitability as a fuel, Fuel, vol. 76, 1997, pp. 1527-2535.

G. Atesok, F. Boylu, A.A. Sirkeci and H. Dincer, The effect of coal properties on the viscosity of coal-water slurries, Fuel, vol. 81, 2002, pp. 1855-1858.

F. Boylu, H. Dincer and G. Atesok, Effect of coal particle size distribution, volume fraction and rank on the rheology of coal-water slurries, Fuel Proc. Tech., vol. 85, 2004, pp. 241-250.

N. V. Pimenova and T. R. Hanley, Measurement of rheological properties of corn stover susspensions, App. Biochem. And Biotech., vol. 105-108, 2003, pp. 383-392.

A. Barnes and Q. D. Nguyen, Rotating vane rheometry—a review, J. Non-Newtonian Fluid Mech. vol. 98, 2001, pp. 1-14.

N. I. Heywood, Stop you slurries from stirring up trouble, Chem. Engr Proc. vol. 95, 1999, pp. 21-40.

S. K. Majumder, K. Chandna, D. S. De and G. Kundu, Studies on flow characteristics of coaloil-water slurry system, Int. J of Miner. Proc., vol. 79, 2006, pp. 217-224.

Ayhan Demirbas, Thermochemical Conversion of Biomass to Liquid Products in the Aqueous Medium, *Energy Sources*, 27:1235-1243, 2005.

Kreda, Silvia et al, G-protein-coupled receptors as targets for gene transfer vectors using natural small-molecular ligands, *Nature Biotechnology*, vol. 18 Jun. 2000.

Steynberg, A.; Dry, M., FT Technology Studies in surf Science and Catalysis, ec., vol. 152, 2005.

Sheldon, R.A. Chemicals from Synthesis Gas, 1983.

Van der Laan, G.P., Thesis, University of Groningen, Netherlands, 1999.

Olsen et al., Unit processes and principles of chemical enginnering, D.Van Nostrand Co., 1032, pp. 1-3.

* cited by examiner

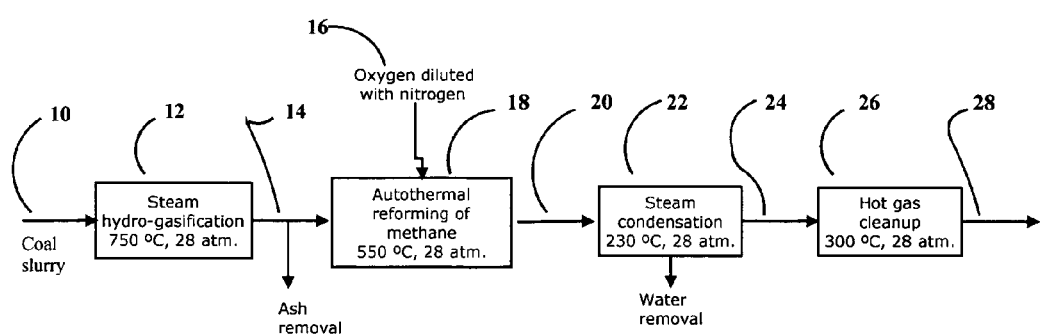

PROCESS FOR ENHANCING THE OPERABILITY OF HOT GAS CLEANUP FOR THE PRODUCTION OF SYNTHESIS GAS FROM STEAM-HYDROGASIFICATION PRODUCER GAS

FIELD OF THE INVENTION

The field of the invention is the synthesis of transportation fuel from carbonaceous feed stocks.

BACKGROUND OF THE INVENTION

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting. Alternatively, one can use coal as a feedstock to upgrade low grade dirty solid fuel to a value added convenient clean liquid fuel, such as high quality, environment friendly synthetic diesel or other hydrocarbon fuels.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gas (a mixture of hydrogen and carbon monoxide, also referred to as synthesis gas) cleanly and efficiently from carbonaceous sources, that can be subjected to a Fischer-Tropsch process to produce clean and valuable synthetic gasoline and diesel fuels, will benefit both the transportation sector and the health of society. Such a process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch liquid fuels, produced from synthesis gas, are sulfur-free, aromatic free, and in the case of synthetic diesel fuel have an ultrahigh cetane value.

Biomass material is the most commonly processed carbonaceous waste feed stock used to produce renewable fuels. Waste plastic, rubber, manure, crop residues, forestry, tree and grass cuttings and biosolids from waste water (sewage) treatment are also candidate feed stocks for conversion processes. Biomass feed stocks can be converted to produce electricity, heat, valuable chemicals or fuels. California tops the nation in the use and development of several biomass utilization technologies. Each year in California, more than 45 million tons of municipal solid waste is discarded for treatment by waste management facilities. Approximately half this waste ends up in landfills. For example, in just the Riverside County, California area, it is estimated that about 4000 tons of waste wood are disposed of per day. According to other estimates, over 100,000 tons of biomass per day are dumped into landfills in the Riverside County collection area. This municipal waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30-$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is a simple example of using biomass to produce heat energy. Unfortunately, open burning of biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gas for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming. In the future, these co-production processes could provide clean-burning fuels for a renewable fuel economy that could be sustained continuously.

A number of processes exist to convert coal and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

More recently, a process was developed in our laboratories to produce synthesis gas in which a slurry of particles of carbonaceous material in water, and hydrogen from an internal source, are fed into a hydro-gasification reactor under conditions to generate rich producer gas. This is fed along with steam into a steam pyrolytic reformer under conditions to generate synthesis gas. This process is described in detail in Norbeck et al. U.S. patent application Ser. No. 10/503,435 (published as US 2005/0256212), entitled: "Production Of Synthetic Transportation Fuels From Carbonaceous Material Using Self-Sustained Hydro-Gasification."

In a further version of the process, of particular interest here, using a steam hydro-gasification reactor (SHR) the carbonaceous material is heated simultaneously in the presence of both hydrogen and steam to undergo steam pyrolysis and hydro-gasification in a single step. This process is described in detail in Norbeck et al. U.S. patent application Ser. No. 10/911,348 (published as US 2005/0032920), entitled: "Steam Pyrolysis As A Process to Enhance The Hydro-Gasification of Carbonaceous Material." The disclosures of U.S. patent application Ser. Nos. 10/503,435 and 10/911,348 are incorporated herein by reference.

Producing synthesis gas via gasification and producing a liquid fuel from synthesis gas are totally different processes. Synthesis gas is produced using a steam methane reformer (SMR), a reactor that is widely used to produce synthesis gas for the production of liquid fuels and other chemicals. The reactions taking place in the SMR can be written as follows.

$$CH_4 + H_2O \longrightarrow CO + 3H_2 \quad (1)$$

or $$CH_4 + 2H_2O \longrightarrow CO_2 + 4H_2 \quad (2)$$

Carbon monoxide and hydrogen are produced in the SMR by using steam and methane as the feed. Conventionally, heating processed water in a steam generator produces the required steam, and the methane is usually supplied in the form of compressed natural gas, or by means of a light molecular weight off-gas stream from a chemical or refinery process.

Alternatively, the product gas from an SHR can be used as the feedstock for the SMR by first removing sulfur impurities from the product stream from the SHR with a hot gas cleanup unit that operates at process pressures and is located in between the SHR and SMR. This entire process is described in U.S. patent application Ser. No. 11/489,308, the entirety of which is incorporated herein by reference. However, steam content of up to 50 weight % can be encountered with the producer gas being obtained from the steam-hydrogasification process. This large content of steam can deteriorate the sulfur capture capacity of metal oxide sorbents used in a hot gas cleanup process by shifting the equilibrium of the following reaction toward the backward direction:

$$MO + H_2S \leftrightharpoons MS + H_2O$$

where MO and MS denote metal oxide and metal sulfide, respectively. Deterioration of the sulfur capture capacity of the sorbents then leads to (i) higher concentrations of $H_2S$, thereby leading to detrimental affects on the conventional nickel-based catalysts used for steam reforming of methane, catalysts known to be quite vulnerable to sulfur contaminants in an irreversible manner, (ii) greater contamination of synthesis gas with $H_2S$, and (iii) poorer production of synthesis gas due to more frequent process turnaround for catalyst replacement and pressure drop abatement.

Therefore, use of metal oxide sorbents for $H_2S$ removal becomes quite stringent as the sorbents are required to function in adverse conditions of large steam content, to the extent sufficient to prevent sulfur-poisoning of the catalyst for steam reforming of methane. Thus, there is a need for an improved process to enhance the operability of hot gas cleanup of steam-hydrogasification producer gas.

BRIEF SUMMARY OF THE INVENTION

This invention provides an improved, economical alternative method for enhancing the operability of hot gas cleanup of steam-hydrogasification producer gas. This is accomplished by changing the sequence of the process to a sequence comprising:
  steam-hydrogasification;
  autothermal reforming of methane;
  steam removal by condensation; then
  hot gas cleanup.

More particularly, a process is provided for enhancing the operability of hot gas cleanup for the production of synthesis gas in which a stream of methane rich gas is autothermally reformed at a temperature and pressure sufficient to generate a stream of synthesis gas rich in hydrogen and carbon monoxide, about 550° C. to about 750° C. The synthesis gas is subjected to condensation and removing the resultant water, and sulfur impurities are removed from the resultant synthesis gas stream in the absence of moisture, which condition is favorable to sulfur capture by the sorbents. The synthesis gas stream resulting from condensation is heated to substantially the temperature at which the impurities are removed from the synthesis gas stream, about 250° C. to about 400° C.

The stream of methane rich producer gas can be produced from separate steam pyrolysis and hydro-gasification reactors, but preferably, the stream of methane rich producer gas is produced from steam-hydrogasification before being subjected to autothermal reforming. Again preferably, the pressure of the steam-hydrogasification, autothermal reforming, condensation, and sulfur impurity removal is substantially the same throughout, about 150 psi to 500 psi.

The carbonaceous material can comprise municipal waste, biomass, wood, coal, or a natural or synthetic polymer. The synthesis gas generated by the removing impurities stage can be used as fuel for process heat and/or in a fuel engine or gas turbine that can generate electricity. The autothermal methane reforming is preferably conducted under conditions whereby the composition of synthesis gas produced has a $H_2$:CO mole ratio of 3 to 4 and the synthesis gas generated by the removing impurities stage is fed into a Fischer-Tropsch reactor under conditions whereby a liquid fuel is produced. Exothermic heat from the Fischer-Tropsch reaction can be fed to the steam-hydrogasification reaction and/or an autothermal methane reforming reaction.

In another embodiment, an apparatus is provided for converting carbonaceous material to synthesis gas, comprising a steam-hydrogasification reactor for simultaneously heating carbonaceous material with liquid water in the presence of both hydrogen and steam, at a temperature and pressure sufficient to generate a stream of methane rich gas, and autothermal methane reforming means to generate a stream of synthesis gas rich in hydrogen and carbon monoxide, means for condensing subjecting said synthesis gas to condensation, whereby synthesis gas is substantially devoid of water, and means for removing sulfur impurities from the said synthesis gas stream devoid of water.

The apparatus can include a Fischer-Tropsch type reactor for receiving the purified generated synthesis gas to produce a liquid fuel. Means can be provided for transferring exothermic heat from the Fischer-Tropsch type reaction to the steam-hydrogasification reactor and/or autothermal methane reforming means.

BRIEF DESCRIPTION OF THE DRAWINGS

For a more complete understanding of the present invention, reference is now made to the following descriptions taken in conjunction with the accompanying drawing, in which:

FIG. 1 is a flow diagram of the process of this invention in accordance with a specific embodiment.

DETAILED DESCRIPTION OF THE INVENTION

This invention provides an improved process scheme that can enhance the operability of hot gas cleanup of steam-hydrogasification producer gas.

One embodiment of this invention discloses replacing the traditional steam-hydrogasification process scheme for the production of synthesis gas comprising of:

[steam-hydrogasification]–[hot gas cleanup]–[steam reforming of methane]

to

[steam-hydrogasification]–[autothermal reforming of methane]–[steam removal by condensation]–[hot gas cleanup].

The improved process scheme can be used where there are separate steam pyrolysis and hydro-gasification reactors, followed by an autothermal reforming reactor, in a process for producing a synthesis gas for use as fuel for process heat and/or in a fuel engine or gas turbine that can generate electricity; or as feed into a Fischer-Tropsch type reactor to produce a liquid paraffinic fuel, recycled water and sensible heat, in a substantially self-sustaining process.

Preferably, the improved process scheme is used with a steam hydro-gasification reactor (SHR) in which carbonaceous material is heated in the presence of both hydrogen and steam to undergo steam pyrolysis and hydro-gasification in a single step.

In order to adopt the improved process, a number of requirements have to be met: (i) the catalyst used for autothermal reforming of methane should be able to maintain activity for methane reforming satisfactorily in high-sulfur environment, and (ii) the temperature for steam condensation prior to hot gas cleanup should not be significantly lower than that for hot gas cleanup at the operating pressure so as to enable modest amounts of heat to be added to bring the resultant gas stream up to substantially the temperature of the hot gas cleanup.

In the preferred embodiment, the first step in the improved process involves feeding hydrogen, internally generated, into a SHR along with a carbonaceous feedstock and liquid water. The resultant producer gas, which is rich in methane, enters the autothermal reforming reactor. Oxygen diluted with nitrogen is separately fed to the autothermal reforming reactor: oxygen content needs to be preferably about 15% volm to 25% volm.

Within the autothermal reforming reactor, noble metal catalysts are preferably used. Compared with the nickel-based catalysts used for steam reforming of methane, noble metal catalysts used for autothermal reforming of methane are known to have higher activity and superior sulfur-resistance as well as regenerability. Therefore, methane-rich gas produced from steam-hydrogasification can be reformed with the increased operability by means of autothermal reforming: the methane-rich gas containing high concentration of hydrogen sulfide can be reformed to synthesis gas for extended time on stream and the used catalyst can be regenerated in an inert gas atmosphere. Examples of noble metal catalysts which can be used are Engelhard's ATR-7B and Haldor Topsoe's RKS-2-7H or RKS-2P.

After the autothermal reforming of methane, steam can be removed from the process by condensation at a temperatures not substantially lower than that for hot gas cleanup. In the case of 28 bar operating pressure, steam condenses to water at 230° C., which can then be removed from the process stream before it is fed to the stage of hot gas cleanup. By removing the steam prior to hot gas cleanup, the sulfur capture capacity of the metal oxide sorbents used in the hot gas clean up stage can be fully utilized; and the energy load required to reheat the process stream for hot gas cleanup can be lowered to a great extent as the specific heat of the process stream decreases significantly due to steam removal. For example, optimum temperature for hot gas cleanup by ZnO sorbent is around 300° C., therefore, the process stream cooled down to 230° C. for steam condensation needs to be reheated only by 70° C.

After removal of the steam, the resulting synthesis gas is directed to a hot gas cleanup process which includes passing through a clean up filter, e.g. a candle filter assembly, at about 350° C. and about 400 psi. This is followed by passage of the gas into a gas cleanup unit. Sulfur impurities existing in the SHR product gas, mostly in the form of hydrogen sulfide, are removed by passing the synthesis gas through a packed bed of metal oxide sorbents in the gas cleanup unit, particulate matter being taken from a cake outlet.

Active sorbents include, but are not limited to, Zn based oxides such as zinc oxide, sold by Süd-Chemie, Louisville, Ky. Porous metal filter elements are available from Bekaert in Marietta, Ga. in the appropriate forms and sizes, such as Bekpor® Porous Media which is made from stainless steel sintered fiber matrix with a pore size of 1 micro meter. These sorbents and filter elements allow the effects of pressure drop and gas-solid mass transfer limitations to be minimized. At a pressure of 28 bar, temperatures in the range of 250° C. to 400° C. and space velocities up to 2000/hr have been used in the desulphurization of SHR product gas. The used sorbents in the gas cleanup unit can be replaced with fresh sorbents once the sulfur capture capacity is reduced significantly.

Once nitrogen is separated by a gas-separation device for being recycled to the autothermal reforming reactor, the resulting synthesis gas is then available for the production of fuels and process heat, or the synthesis gas is fed to a Fischer-Tropsch type reactor in a process that can produce a zero-sulfur, ultrahigh cetane value diesel-like fuel and valuable paraffin wax products. The absence of sulfur enables low pollutant and particle emitting diesel fuels to be realized. Useful by-products can be produced, for example, purified water, which can be re-cycled to create the slurry feed into the process. The Fischer-Tropsch reaction also produces tail gas that contains hydrogen, CO, $CO_2$, and some light hydrocarbon gases. Hydrogen can be stripped out of the tail gas and recycled either to the SHR or the Fischer-Tropsch reactor. Any small amounts of other gases such as CO and CO may be flared off.

Referring to FIG. 1, a schematic flow diagram of the process is shown. A mixture 10 of about coal 41% wt, $H_2O$ 52% wt, and $H_2$ 7% wt is introduced into a reactor of steam pyrolysis and hydro-gasification 12 at a temperature of about 750° C., and a starting pressure of about 28.0 bar. This reaction produces a mixture 14 of $H_2$ 15.3% (volm), CO 1.1% (volm), $CO_2$ 1.0% (volm), $CH_4$ 34.3% (volm), $H_2O$ 48.3% (volm), and $H_2S$ 1000 ppm, whereupon ash, the un-reacted residue from the hydro-gasification reaction, is periodically removed from the bottom of the reactor vessel.

At the next stage autothermal reforming of methane 18 occurs with the mixture 14 and a mixture 16 (in % volm) of oxygen 17% and nitrogen 83% at a temperature of about 550° C., and a starting pressure of about 28.0 bar, resulting in a mixture 20 (in % volm) of $H_2$ 41.9%, CO 12.8%, $CO_2$ 2.5%, $CH_4$ 1.8%, $H_2O$ 13.7%, $N_2$ 27.3%, and $H_2S$ 550 ppm. The volume ratio of the mixture 16 to the mixture 14 is about 0.41.

Steam is then removed by condensation at stage 22 at a temperature of about 230° C., and a starting pressure of about 28.0 bar. The water resulting from the condensation of steam is then removed from the process stream before the hot gas clean up stage 26, leaving a mixture 24 (in % volm) of $H_2$ 48.6%, CO 14.8%, $CO_2$ 2.9%, $CH_4$ 2.1%, $N_2$ 31.6%, and $H_2S$ 640 ppm. This mixture 24 enters the hot gas clean up stage 26 where a temperature of about 300° C., and a starting pressure of about 28.0 bar is applied to produce a desulfurized gas mixture 28 (in % volm) of $H_2$ 48.6%, CO 14.8%, $CO_2$ 2.9%, $CH_4$ 2.1%, $N_2$ 31.6%, and $H_2S$ less than 0.1 ppm.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily be appreciated from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

The invention claimed is:

1. A process for enhancing the operability of hot gas cleanup for the production of synthesis gas, comprising:

providing a stream of producer gas, obtained from steam hydrogasification, comprising methane, water and sulfur impurities;

autothermally reforming the producer gas at a temperature and pressure sufficient to generate a stream of synthesis gas comprising hydrogen, carbon monoxide, steam, and sulfur impurities at a temperature of between 550° C. to 750° C.;

after the step of autothermally reforming performing a step of cooling said synthesis gas to thereby effect condensation of the steam, and removing the steam;

after the step of condensing and removing the steam performing a step of heating the synthesis gas to a sulfur removal temperature of between 250° C. to 400° C.;

removing, after the step of heating the syngas, said sulfur impurities from the heated synthesis gas stream using a metal oxide sorbent to thereby produce a cleaned synthesis gas; and removing nitrogen from the cleaned synthesis gas.

2. The process of claim 1 wherein the condensation of the synthesis gas stream is at substantially the pressure at which the impurities are removed from the synthesis gas stream.

3. The process of claim 1 wherein the pressure of the steam-hydrogasification, autothermal reforming, condensation, and impurity removal is the same throughout.

4. The process of claim 1 wherein the autothermal methane reforming is conducted under conditions whereby the composition of synthesis gas produced has a H2: CO mole ratio of 3 to 4.

5. The process of claim 1 in which synthesis gas generated by the removing impurities stage is used as fuel for process heat and/or in a fuel engine or gas turbine that can generate electricity.

6. The process of claim 1, wherein the autothermally reforming step is performed using noble metal catalysts.

7. The process of claim 3 wherein said substantially the same pressure is in the range of about 150 psi to 500 psi.

8. The process of claim 1 wherein the stream of methane rich gas reacts for autothermal reforming with oxygen stream diluted with nitrogen, the oxygen content of which is in the range of about 15% volm to 25% volm.

9. The process of claim 1 wherein the stream of the producer gas is produced from separate steam pyrolysis and hydro-gasification reactors.

10. The process of claim 9 wherein the producer gas is produced from carbonaceous material that comprises municipal waste, biomass, wood, coal, or a natural or synthetic polymer.

11. The process of claim 1, further comprising feeding the synthesis gas, after it has been removed of the impurities, into a Fischer-Tropsch type reactor under conditions whereby a liquid fuel is produced.

12. The process of claim 11 comprising transferring exothermic heat from the Fischer-Tropsch type reaction to a steam-hydrogasification reaction and/or an autothermal methane reforming reaction.

13. A process for enhancing the operability of hot gas cleanup for the production of synthesis gas, comprising:

providing a stream of producer gas, produced by steam-hydrogasification, comprising methane, water and sulfur impurities;

autothermally reforming the producer gas comprising the methane, water and sulfur impurities by reacting with oxygen diluted with nitrogen, the oxygen content of which is in the range of about 15% volm to about 25% volm, at about 550° C. to about 750° C. and at a pressure sufficient to generate a stream of synthesis gas rich in hydrogen, carbon monoxide, and steam;

after the step of autothermally reforming performing a step of subjecting said synthesis gas to condensation and removing the steam;

after the step of condensing and removing the steam performing a step of heating the synthesis gas stream resulting from condensation to substantially the temperature of about 250° C. to 400° C.; and removing the impurities, after said condensation, from the resultant synthesis gas stream at about 250° C. to 400° C. using a metal oxide sorbent to thereby produce a cleaned synthesis gas;

wherein the pressure of the steam-hydrogasification, autothermal reforming, condensation, and impurity removal are the same throughout in the range of about 150 psi to 500 psi; and removing nitrogen from the cleaned synthesis gas.

* * * * *